Feb. 26, 1935.   A. DUPRET   1,992,523
VANITY BOX
Filed March 13, 1934
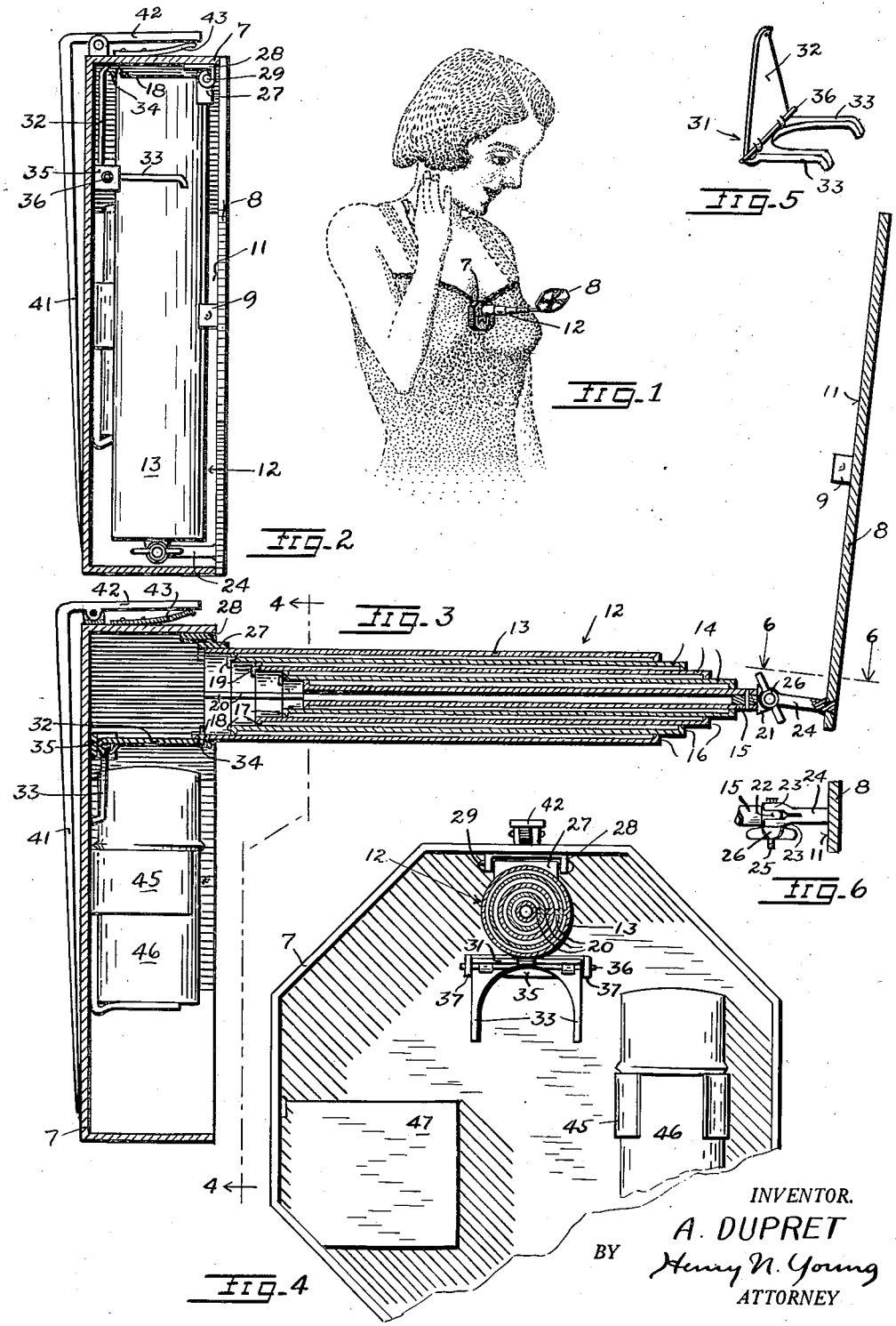
INVENTOR.
A. DUPRET
BY Henry N. Young
ATTORNEY Patented Feb. 26, 1935

1,992,523

UNITED STATES PATENT OFFICE 1,992,523

VANITY BOX

A. Dupret, Richmond, Calif.

Application March 13, 1934, Serial No. 715,325

9 Claims. (Cl. 132—83)

The invention relates to a vanity box comprising a container for toilet accessories and having a cover which provides a mirror.

An object of the invention is to provide for the support of the vanity box cover from, and in spaced relation to, the container as a means of disposing the mirror for use.

Another object is to provide a simple bracket means for supporting the cover and mirror in extended position and for complete concealment in the container when the cover is operative as a closure for the container.

A further object of the invention is to provide for an angularly adjusted disposal of the mirror with respect to the container whereby the mirror may be set in position for use while it is carried by the bracket.

An added object is to provide for mounting the vanity box on a person's clothing in such a position that the mirror may be extended and utilized by the person carrying the vanity box.

The invention possesses other objects and features of advantage, some of which, with the foregoing, will be set forth or be apparent in the following description of a typical embodiment of the device, and in the accompanying drawing, in which, Figure 1 shows a vanity box embodying the present invention mounted on a person's garment and having the mirror element thereof disposed in position for use by the person.

Figure 2 is an upright and off-center sectional view of the vanity box assembly when the same is closed.

Figure 3 is an upright and central section taken through the vanity box assembly, a mirror-supporting bracket of the assembly being partly extended for the use of the mirror.

Figure 4 is a partly sectional view at 4—4 in Figure 3.

Figure 5 is a perspective view of a catch element of the structure.

Figure 6 is a fragmentary view at 6—6 in Figure 3.

As particularly illustrated, the features of the present invention are incorporated in the structure of a vanity box assembly including an open-sided container 7 and a cover element 8 for fitted engagement with the container as a closure for its open side. In the present structure, the cover 8 is arranged for releasable mounting in operative position on the container by reason of the engagement at spaced points within the container rim of a plurality of spring clips 9 carried by the cover and extending transversely from the inner side thereof.

A mirror is suitably provided at the inner side of the cover whereby the mirror may be concealed when the cover is in place. If desired, the inner face 11 of the cover 8 may itself be of a suitably polished material to provide a reflecting surface for use as a mirror, such being assumed in the present showing. It will be understood, however, that a separate mirror element might be provided and mounted at the inner cover face as an alternative and operatively equivalent means for the purpose. For descriptive convenience, the cover 8 may hereinafter be referred to as a mirror as occasion may require.

In accordance with the purpose of supporting the mirror member 8 from the container in spaced relation thereto, said member is mounted at one end of a collapsible bracket having its other end fixed to the container. The bracket should be laterally rigid when it is extended and should be disposable entirely within the container when it is collapsed. As particularly shown, a telescopic bracket 12 is provided as meeting the foregoing requirements, it being understood, however, that other types of brackets might be adapted and used for the purpose.

The bracket 12 is seen to essentially comprise a set of telescopically engaged tubular members including an outer member 13, intermediate members 14, and an inner member 15; as particularly shown the bracket members are of like length. At their outer ends, the members 13 and 14 are provided with inturned flanges 16 providing bores slidably engaging the exteriors of the members which they immediately enclose. At their inner ends, the members 14 and 15 are provided with outturned flanges 17 providing outer faces which slidingly engage the bores of the bracket members which immediately enclose them. It will be understood that the flanges 16 and 17 are mutually cooperative to confine the extension of the bracket to its desired limit.

Stop pins 18 and 19 may be provided at the inner ends of the members 13 and 14 respectively to extend radially inwardly for preventing a reverse extension of the bracket assembly. Means are provided for preventing relative rotations of the tubular members of the bracket; as shown, said means comprises the provision of longitudinal ribs or splines 20 on the inner bore faces of the members 13 and 14 for engagement in complementary notches provided in the flanges 17. If the members were of similar polygonal crosssection, the splines 20 would, of course, be unnecessary.

At its outer end, the bracket member 15 carries an element 21 providing an ear 22 for engagement between the ears 23 of a forked end portion of a post 24 which extends rigidly from the reflector side of the mirror 8. A bolt 25 extends through registering perforations in the ears 22 and 23, and a wing-nut 26 is mounted on said bolt whereby the ears may be clamped together between the bolt head and the nut for fixing the mirror in angularly adjusted relation to the longitudinal axis of the bracket assembly.

It will now be noted that when the bracket axis extends transversely of the plane of the container 7 in the position shown in Figures 1 and 3, the depth of the relatively shallow container, as measured from its open side must, at best, exceed the length of the collapsed telescope whereby the required number of such members would be excessive and impracticable if the container is to be as shallow as that shown. It is therefore preferred to dispose the collapsed bracket flat in the container, and appropriate provision is made for effecting this disposal of the bracket.

As shown, the bracket member 12 is hingedly secured at its inner end to the top of the container at an inside point thereof adjacent its rim whereby the collapsed bracket may be swung into the container space for disposal in the position thereof shown in Figure 2. The present hinge means is seen to comprise a block 27 mounted on the member 13, a member 28 mounted on the container wall and providing eyes at opposite ends of the block 27, and pivot pins 29 extending through said eyes and into the block. It will be noted that the post 24 is of the required length to permit the aforesaid disposal of the collapsed bracket in the container and the simultaneous disposal of the cover-mirror member 8 in position to close the container, the nut 26 having been loosened on the bolt 25. For permitting the present folding of the parts together, the post 24 is fixed adjacent the lower edge of the member 8, this arrangement also effecting a desirable raising of the member above the container level when the mirror is to be used.

Means are provided for securing the bracket 12 in its outwardly swung position, and, as shown, said means comprises a member 31 which provides a strut arm 32 and spring arms 33 disposed in mutually perpendicular relation. At its outer end, the strut arm 32 is perforated to receive a pin 34 extending from the inner end of the bracket member 13 at its lower side, said pin and the stop pin 18 being shown as comprising parts of a single element which is fixed in the member 13. As shown in Figure 3, the strut arm 32 is arranged to engage the outer face of the member 13 and extends in general alignment therewith to a bearing at its base with a plate member 35 mounted on the back wall of the container. When the strut arm is in the operative position shown, the extremitites of the spring arms 33 resiliently engage the back of the container below the bearing point of the strut arm whereby to urge a retention of the latter against the member 13 for retaining the pin in its engaged extension therethrough.

Before the bracket may be folded within the container, the strut 32 must be disposed out of the way against the back of the container as is shown in Figure 2, or must be otherwise displaced from its operative position. For effecting the aforesaid inoperative disposition of the strut, the same is released from the pin 34 by springing it away from the bracket member 13, the bracket assembly is swung upwardly to a slight degree to permit a swinging of the strut to its inoperative position, and the member 31 is then rotated about its bearing axis to the position shown in Figure 2, it being noted that the spring arms of the member 31 are so shaped and spaced as to receive the bracket member 13 between them when the collapsed bracket assembly is disposed within the container. To insure the proper disposition of the member 31 at all times, this member may be provided with a pivot pin 36 which is loosely mounted therein and engages in and between ears 37 which are provided at opposite ends of the bearing plate 35 to receive the member 31 between them.

Means are provided for mounting the container 7 in upright position on a person's clothing in such a location that when the bracket 12 is extended, the mirror 8 may be set for the viewing of a face or hair portion by the person while leaving both of the person's hands free. As particularly shown, said means comprises a pin member 41 hinged to the top of the container and extending downwardly along its back, and comprising one arm of a lever having its other arm 42 overlying the top of the container. A leaf spring 43 is operative between the arm 42 and the container top to urge a retention of the pin against the container back. In this manner, the container may either be clamped on and over the top edge of the garment, as is indicated in Figure 1, or the pin 41 may be inserted in the goods of a garment front portion in a usual manner for support therefrom. It will be understood that pressing the arm toward the container will dispose the pin 41 outwardly of the container back for facilitating either type of installation of the vanity box.

The portion of the container space not required for receiving the bracket may be utilized for receiving toilet accessories and/or other articles. As particularly shown, a clip 45 is provided in the container space for receiving and holding a lip rouge stick 46, or some other cylindric article, and a pocket 47 is also provided in said space for receiving a powder puff or the like. It will thus be understood that the present vanity box may contain various toilet accessories which may be used by the aid of the mirror 8 when the latter is extended in the manner taught.

With the disclosed structure, the present vanity box need be no larger than a large brooch and may appear and be worn as such. The present unitary structure may be shaped and externally ornamented in any desired manner, the ornamentation extending to the outer face of the cover member 8 which provides the mirror on its inner face. It will be noted that the present vanity box may be conveniently and suitably mounted on such articles of clothing as swimming suits and sports wear where outdoor use of a mirror may be occasionally desired; the present vanity box normally appears as a decorative brooch, yet provides the usual facilities of a vanity box or toilet kit for ready accessibility and use.

From the foregoing description taken in connection with the accompanying drawing, the advantages of the construction and method of use will be readily understood by those skilled in the art to which the invention appertains. While the present disclosure specifically covers the features and principle of operation of a device which is now deemed to be a preferred embodiment of the invention, it is to be understood

I claim:

1. In a vanity box, a container having an open side, a mirror for application at said open container side as the container closure thereat and in inwardly facing relation to the container and an extensible bracket normally disposed entirely within the container in collapsed condition and connecting the container and mirror for its extension to support the mirror at a distance from the container.

2. In a vanity box, a container for toilet accessories, a mirror, and a telescopic bracket unitarily connecting the mirror and container for its extension to dispose and support the mirror at a distance from the container and for its complete retraction within the container space.

3. In a vanity box, a container having a side opening, means for mounting the container on a person's clothing, a mirror for application at said opening as the container closure thereat, and a bracket unitarily connecting the mirror and container in such a manner that the bracket is arranged for its extension to support the mirror at a distance from the container and in position for use by the person wearing the clothing.

4. In a vanity box, a container having a side opening, a member providing a mirror and arranged for application at said opening as a closure thereat to have the reflecting side of the mirror turned inwardly, and a telescopic bracket unitarily connecting the mirror and container in such manner that it is adapted to support the mirror at a distance from the container when extended and is adapted for concealed disposal within the container when collapsed.

5. In a vanity box, a container having a side opening, a normally collapsed telescopic bracket having its base hingedly attached to the container and arranged for disposal within the container with its longitudinal axis parallel to the plane of the said container opening or to be swung about its axis of hinging to have its longitudinal axis transverse to said opening whereby it may be extended to protrude from the container, and a mirror mounted at the outer end of said bracket.

6. In a vanity box, a container comprising a bottom wall and a continuous side wall cooperative to provide a relatively shallow container having an open side, means to mount said container on a person's garment and with its plane generally upright, an extensible bracket normally collapsed and disposed within the container in the plane thereof, means hingedly connecting the base of said bracket to said container at a point therewithin whereby to provide for a swinging of the bracket to a position in which it is disposed transversely of the container plane for extension from the container, means coactive between the container and bracket to releasably secure the bracket in the latter said position thereof, and a mirror carried at the free bracket end for adjusted disposal generally opposite the container and in position for use by the person on whose garment the container is mounted.

7. In a vanity box, a container comprising a back wall and a continuous side wall cooperative to provide a relatively shallow container having an open side, means to mount said container on a person's garment and with its back wall generally upright, an extensible bracket normally collapsed and disposed within the container in the plane thereof, means hingedly connecting the base of said bracket to said container at a point therewithin and at the top of the container whereby to provide for a swinging of the bracket to a position in which it extends from the top of the container, means positively coactive between the container and bracket to releasably secure the bracket in the latter said position thereof, and a mirror hingedly carried at the free bracket end for angularly adjusted disposal above the bracket while presenting its reflecting face for viewing by a person wearing the clothing on which it is mounted.

8. A structure in accordance with claim 7 wherein the bracket comprises a telescopic assembly of tubular elements.

9. A structure in accordance with claim 7 wherein the container mounting means comprises a spring-pressed pin member pivotally mounted at the container top and extending downwardly along the outside of the container back wall for clamping an engaged garment portion between it and the back wall.

A. DUPRET.